(12) United States Patent
Tokutsu et al.

(10) Patent No.: US 8,199,383 B2
(45) Date of Patent: Jun. 12, 2012

(54) AUTO DOCUMENT FEEDING DEVICE AND IMAGE SCANNING DEVICE

(75) Inventors: Akihito Tokutsu, Kanagawa (JP); Seiji Iino, Kanagawa (JP); Mitsunori Ishii, Tokyo (JP); Masakazu Iwamoto, Kanagawa (JP); Shinichi Miyakawa, Kanagawa (JP); Osamu Kitazawa, Kanagawa (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 426 days.

(21) Appl. No.: 12/492,318

(22) Filed: Jun. 26, 2009

(65) Prior Publication Data

US 2010/0014902 A1    Jan. 21, 2010

Related U.S. Application Data

(60) Provisional application No. 61/081,687, filed on Jul. 17, 2008, provisional application No. 61/081,692, filed on Jul. 17, 2008.

(51) Int. Cl.
  *H04N 1/04* (2006.01)
(52) U.S. Cl. ......... 358/498; 358/496; 358/408; 358/488
(58) Field of Classification Search ........... 358/498, 358/496, 408, 488; 399/364, 367, 374; 271/9.04, 271/9.02, 265.01, 3.04, 3.05, 3.15
See application file for complete search history.

(56) References Cited

U.S. PATENT DOCUMENTS

| 6,038,424 | A | 3/2000 | Nakagawa |
| 6,618,575 | B2 | 9/2003 | Takida |
| 7,481,427 | B2 | 1/2009 | Tokutsu |
| 2006/0164695 | A1 | 7/2006 | Tokutsu |
| 2009/0074490 | A1 | 3/2009 | Shoji |
| 2009/0251744 | A1* | 10/2009 | Tokutsu ............... 358/498 |
| 2010/0109226 | A1* | 5/2010 | Kitazawa et al. ...... 271/3.14 |
| 2011/0007370 | A1* | 1/2011 | Kitazawa et al. ...... 358/498 |
| 2011/0181926 | A1* | 7/2011 | Tokutsu ............... 358/498 |
| 2012/0008178 | A1* | 1/2012 | Tokutsu ............... 358/498 |

FOREIGN PATENT DOCUMENTS

| CN | 1461137 A | 12/2003 |
| CN | 1645896 A | 7/2005 |
| CN | 1854921 A | 11/2006 |
| JP | 04-032859 | 2/1992 |
| JP | 110246101 | 9/1999 |
| JP | 2004-015299 | 1/2004 |
| JP | 2004104247 A * | 4/2004 |
| JP | 2006-168972 | 6/2006 |
| JP | 2006140902 A * | 6/2006 |

OTHER PUBLICATIONS

Office Action dated Dec. 27, 2010 in Chinese counterpart application 200910158995.3 with partial English Translation.

* cited by examiner

*Primary Examiner* — Cheukfan Lee
(74) *Attorney, Agent, or Firm* — Patterson & Sheridan, LLP

(57) ABSTRACT

The lengths of an OUT path and an IN path are made longer than the length of a document of a main size in a traveling direction. The document of the main size stands by for conveyance in a direction of a READ document glass in a state where the entire document is contained in the OUT path or the IN path. The entrance speed of the document into the OUT path or the IN path is equal to the read speed of a scanner. The leading edge of a subsequent document is overlapped on the trailing edge of a preceding document, and the document is conveyed to the READ document glass.

15 Claims, 14 Drawing Sheets

AUTO DOCUMENT FEEDING DEVICE AND IMAGE SCANNING DEVICE

CROSS REFERENCE TO RELATED APPLICATION

This application is based upon and claims the benefit of priority from Provisional U.S. Applications 61/081,687 filed on Jul. 17, 2008 and 61/081,692 filed on Jul. 17, 2008, the entire contents of which are incorporated herein by reference.

TECHNICAL FIELD

The present invention relates to an auto document feeding device for feeding a document to an image reading device used in a copier, a printer or the like, and especially for enabling high-speed reading.

BACKGROUND

In an image scanning device used in an image forming apparatus such as a copier, a printer or the like, the improvement of productivity of image reading is requested. Hitherto, there is a device in which a plurality of document read conveyance paths are formed, a reading sensor to read a front side image of a document and a reading sensor to read a back side image are disposed on each of the conveyance paths, and the read speed at the time of both-side reading of the document image is increased. As this image scanning device, for example, JP-A-2006-168972 discloses a device having a first branch path for conveying a document to a first read position and a second branch path for conveying a document to a second read position. Besides, for example, JP-A-2004-15299 discloses a device in which a scanner device and a CIP (Contact Image Sensor) are provided at both sides of a first conveyance path, and the scanner device and the CIS are simultaneously used to read both surfaces of a document conveyed on the first conveyance path.

However, both the devices do not increase the read speed to improve the productivity of reading when documents are continuously read.

The development of an auto document feeding device is desired in which when documents are continuously read, the arrival timing of a document at an image read position is advanced to efficiently read the document, and the productivity of reading is improved by the enhancement of the read speed of an image.

SUMMARY

An aspect of the invention is to increase the speed of continuous reading of documents by eliminating the conveyance delay of a document to an image reading member and by stably discharging the document from the image reading member.

According to an embodiment, an auto document feeding device includes a register member to align a leading edge of a document from a document placing member, a supply member to supply the document from the document placing member to the register member, a plurality of conveyance members having different paths whose lengths are longer than the whole length of the document in a traveling direction, and which guide the document sent from the document placing member to the first image reading member, a gate member to distribute the document passing through the register member to one of the plurality of conveyance members, and a paper discharge member to discharge the document passing through the first image reading member.

DETAILED DESCRIPTION

Figure 1:
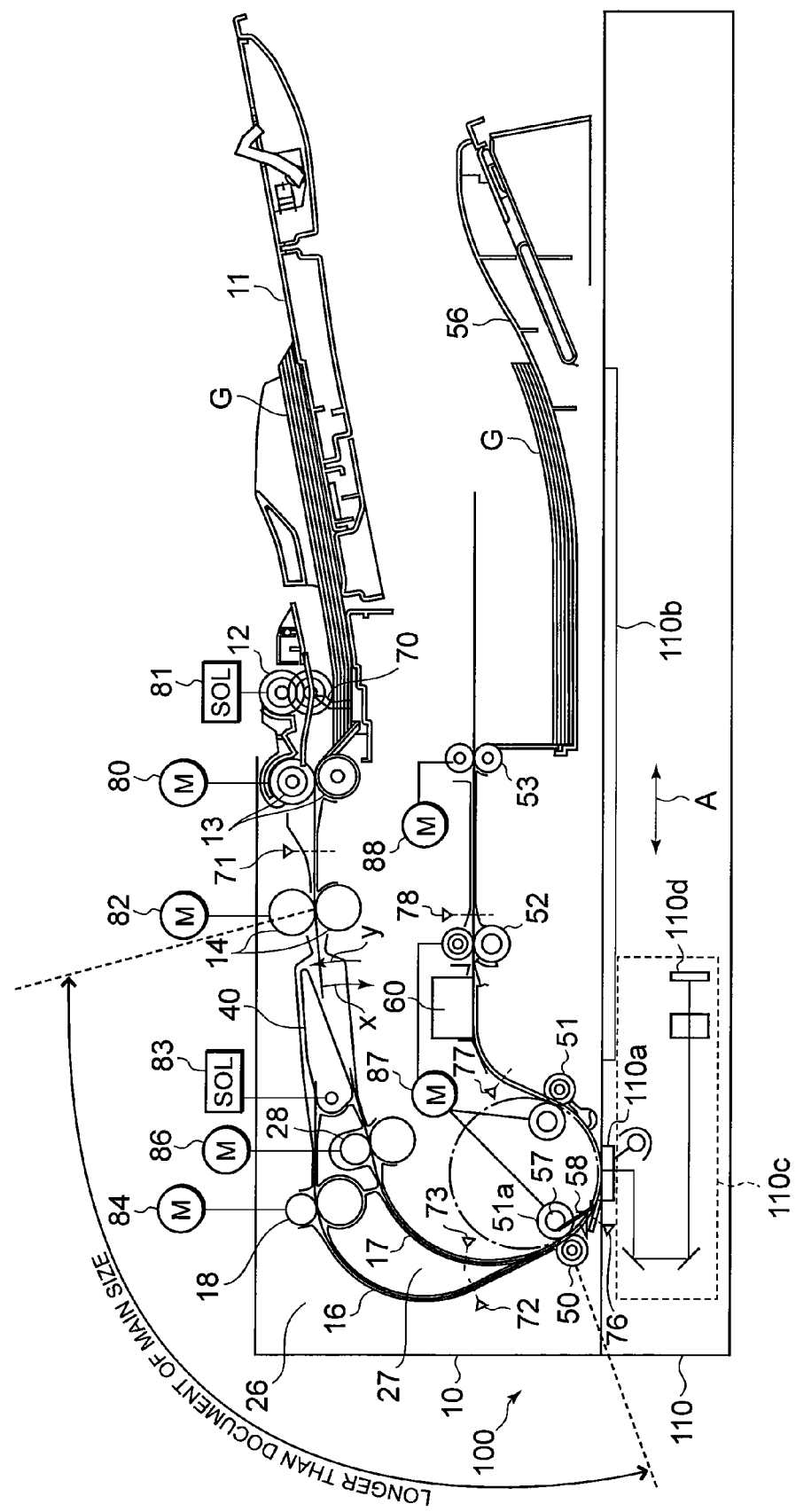
FIG. 1 is a structural view schematically showing an image scanning device of an embodiment.

Hereinafter, an embodiment will be described. FIG. 1 shows an image scanning device 100 of the embodiment. The image scanning device 100 includes a scanner 110 as a first image reading member and an auto document feeding device (ADF) 10 to convey a document G to the scanner 110. The scanner 110 includes a READ document glass 110a and a platen glass 110b of a document mounting table. The scanner 110 includes an optical mechanism 110c. The optical mechanism 110c optically reads an image of the document G traveling on the READ document glass 110a. Alternatively, the optical mechanism 110c is moved in an arrow A direction by a not-shown drive unit along the platen glass 110b, and optically reads the image of the document G placed on the platen glass 110b. The scanner 110 includes a CCD (Charge Coupled Device) 110d to photoelectrically convert an optical signal from the optical mechanism 110c into an electric signal.

The ADF 10 includes a tray 11 as a document placing member, a pickup roller 12 to take out the document G from the tray 11, a separating and feeding roller 13 to prevent double feed of the document G, and a register roller 14 as a register member to align the leading edge of the document G taken out from the tray 11 and conveyed. The pickup roller 12 and the separating and feeding roller 13 constitute a supply member to take out the document from the tray 11 and to supply the document to the register roller 14.

The ADF 10 includes, as conveyance paths, two paths different in passage, that is, an OUT path 16 extending from the register roller 14 to a pre-reading roller 50, and an IN path 17 extending from the register roller 14 to the pre-reading roller 50. The lengths of the OUT path 16 and the IN path 17 are longer than, for example, the whole length of a document of a main size in a traveling direction. The document of the main size means a document whose conveyance frequency is highest among documents of a plurality of sizes which can be conveyed by the ADF 10. The lengths of the OUT path 16 and the IN path 17 may be longer than, for example, the whole length of a document of a maximum size in the traveling direction which can be conveyed by the ADF 10. However, when the length of the document of the main size is shorter than the document of the maximum size, the lengths of the OUT path 16 and the IN path 17 are made longer than the whole length of the document of the main size in the traveling direction while they are shorter than the length of the document of the main size, so that the device can be made smaller than that when they are set to the length of the maximum size whose use frequency is relatively low.

The document of the main size is a document of, for example, A4 size (210 mm×297 mm) of JIS (Japanese Industrial Standards) or letter size (215.9 mm×279.4 mm) of Western letter size, which is conveyed in a longitudinal direction and is used. Incidentally, the document G of the main size is not limited to this. The document G of the main size is arbitrary according to the use of the ADF 10.

Since the lengths of the OUT path 16 and the IN path 17 are longer than the length of the document G of the main size in the longitudinal direction, the OUT path 16 or the IN path 17 can contain the entire document G of the main size. While the document stands by for an image reading operation in the OUT path 16 or the IN path 17, the trailing edge of the document G of the main size passes through the register roller 14.

The OUT path 16, together with the tray 11, the pickup roller 12, the separating and feeding roller 13, and the register roller 14, constitutes an OUT conveyance member 26 as, for example, a first conveyance member. The IN path 17, together with the tray 11, the pickup roller 12, the separating and feeding roller 13, and the register roller 14, constitutes an IN conveyance member 27 as, for example, a second conveyance member. The OUT path 16 includes an intermediate OUT roller 18. The IN path 17 includes an intermediate IN roller 28.

The ADF 10 includes a gate 40 as a gate member to distribute the document G, which was taken out from the tray 11 and passed through register roller 14, to the OUT path 16 or the IN path 17.

The ADF 10 includes the pre-reading roller 50 to convey the document G, which passed through the OUT path 16 or the IN path 17, to the READ document glass 110a of the scanner 110, a post-reading roller 51 to discharge the document G from the READ document glass 110a, a pre-discharge roller 52, a discharge roller 53, and a storage tray 56. The post-reading roller 51, the pre-discharge roller 52 and the discharge roller 53 constitute a paper discharge member.

Figure 2:
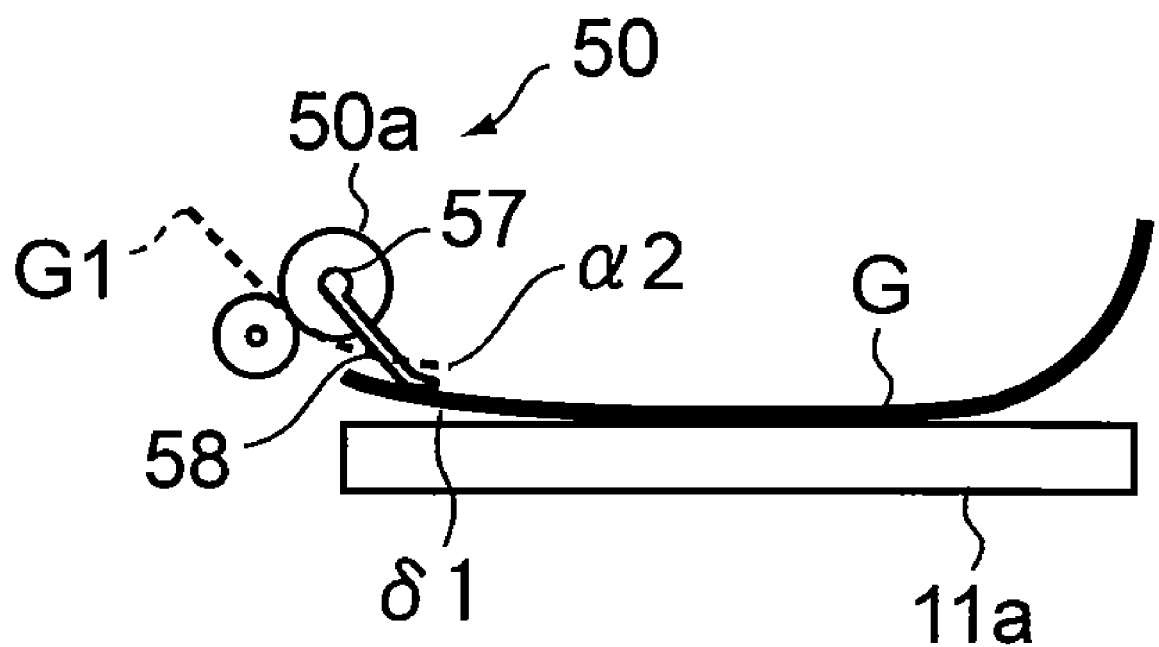
FIG. 2 is a schematic explanatory view showing a Mylar member of the embodiment.

As shown in FIG. 2, a Mylar member 58 as a member to press a document is attached to a shaft 57 of an upper roller 50a of the pair of pre-reading rollers 50. The leading edge of the Mylar member 58 is lightly pressed to the READ document glass 110a. The Mylar member 58 lightly presses the document G passing through the pre-reading roller 50 to the READ document glass 110a side. The Mylar member 58 corrects the curl of the document G, and prevents the trailing edge of the document from curling and lifting. The member to press the document is not limited to the Mylar member 58, and the attachment position thereof may be such that the member is directly attached to the case.

The ADF 10 includes a contact image sensor (CIS) 60 as a second image reading member between the post-reading roller 51 and the pre-discharge roller 52 of the paper discharge member. The CIS 60 may be provided between the pre-discharge roller 52 and the discharge roller 53 of the paper discharge member.

At the READ document glass 110a, an image of a front side, as a first side, of the traveling document G is read. The CIS 60 reads an image of a back side, as a second side, of the traveling document G. By this, the images of both the sides of the document G can be read by once conveying the document G, which is supplied from the tray 11, from the READ document glass 110a to the storage tray 56.

The ADF 10 includes, above the tray 11, an empty sensor 70 to detect the existence or absence of the document G. A register sensor 71 to detect the arrival of the document G at the register roller 14 exists between the separating and feeding roller 13 and the register roller 14. The OUT path 16 includes a paper timing sensor OUT 72 to detect drive timings of the register roller 14 and the intermediate OUT roller 18. The IN path 17 includes a paper timing sensor IN 73 to detect drive timings of the register roller 14 and the intermediate IN roller 28.

The ADF 10 includes a pre-reading sensor 76 between the pre-reading roller 50 and the READ document glass 110a, and includes a reading sensor 77 between the post-reading roller 51 and the pre-discharge roller 52. The ADF 10 includes a paper discharge sensor 78 between the pre-discharge roller 52 and the discharge roller 53.

A paper feed motor 80 drives the pickup roller 12 and the separating and feeding roller 13. A pickup solenoid 81 swings the pickup roller 12. A register motor (RGT motor) 82 rotates and drives the register roller 14. A gate solenoid 83 switches the gate 40. When the gate solenoid 83 is turned off, the gate 40 rotates in an arrow x direction, and distributes the document G to the OUT path 16. When the gate solenoid 83 is turned on, the gate 40 rotates in an arrow y direction, and distributes the document G to the IN path 17.

An intermediate OUT motor 84 rotates and drives the intermediate OUT roller 18. An intermediate IN motor 86 rotates and drives the intermediate IN roller 28. A READ motor 87 rotates and drives the pre-reading roller 50, the post-reading roller 51 and the pre-discharge roller 52. A paper discharge motor 88 rotates and drives the discharge roller 53.

Figure 3:
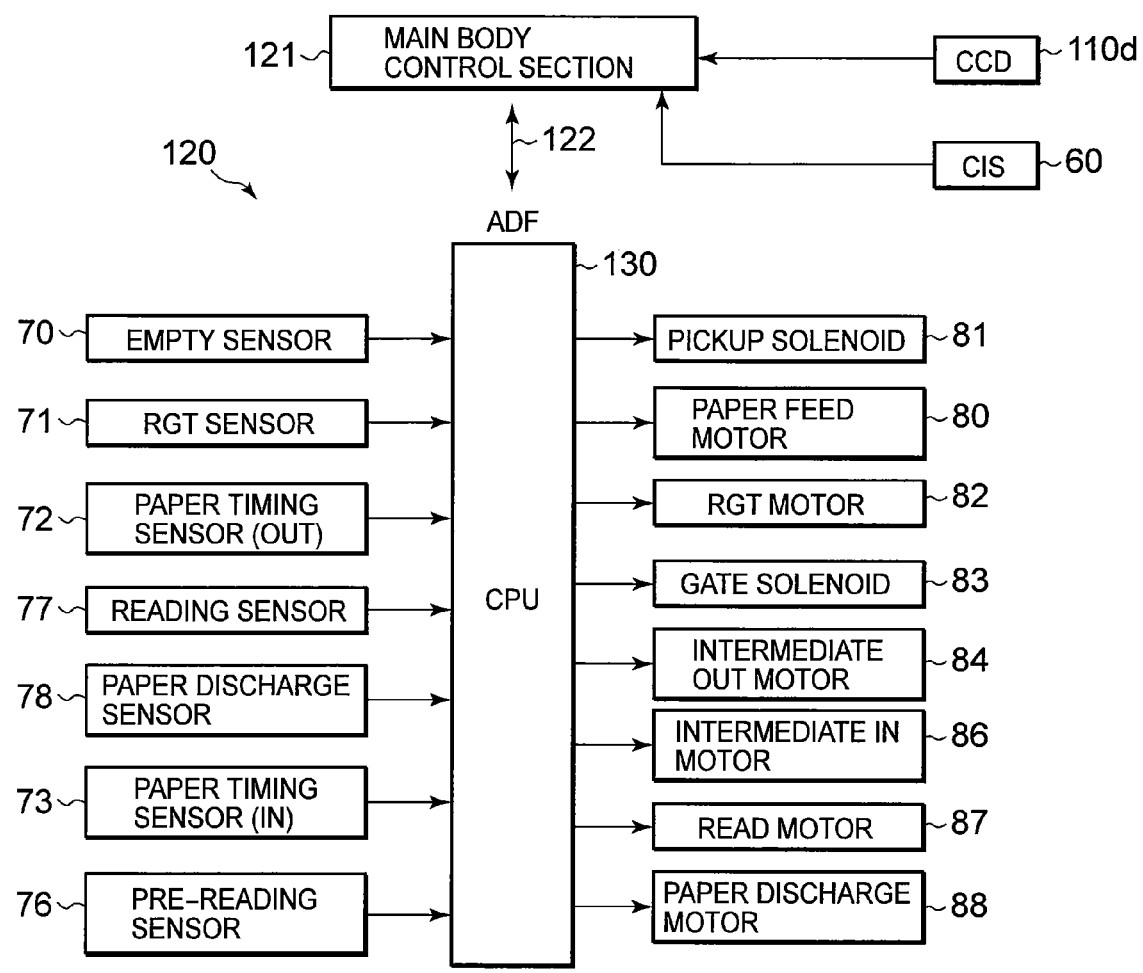
FIG. 3 is a block diagram showing a control system of an ADF of the embodiment.
Figure 4:
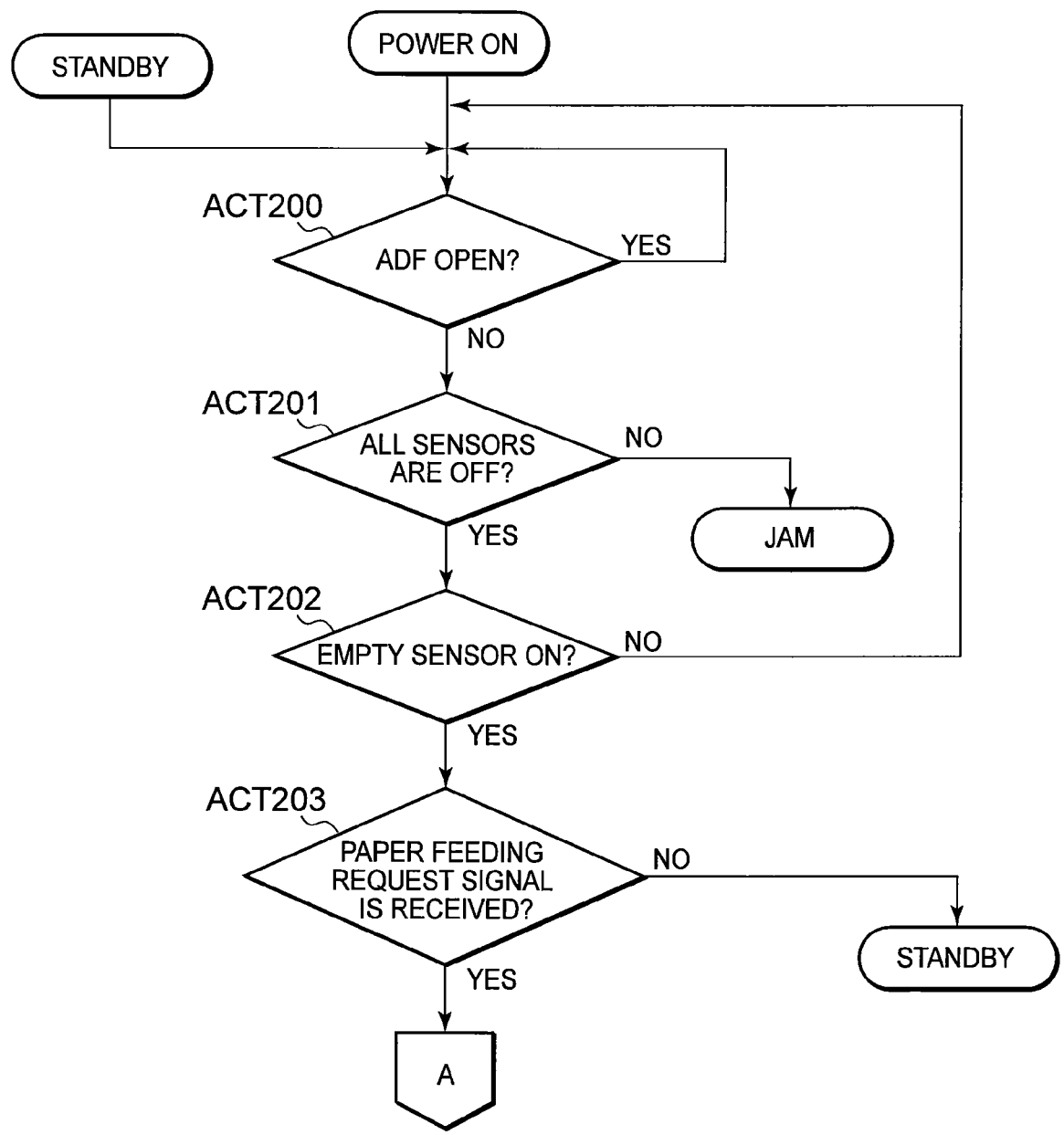
FIG. 4 is a flowchart showing a procedure from power-on to start of document feeding in the embodiment.
Figure 5:
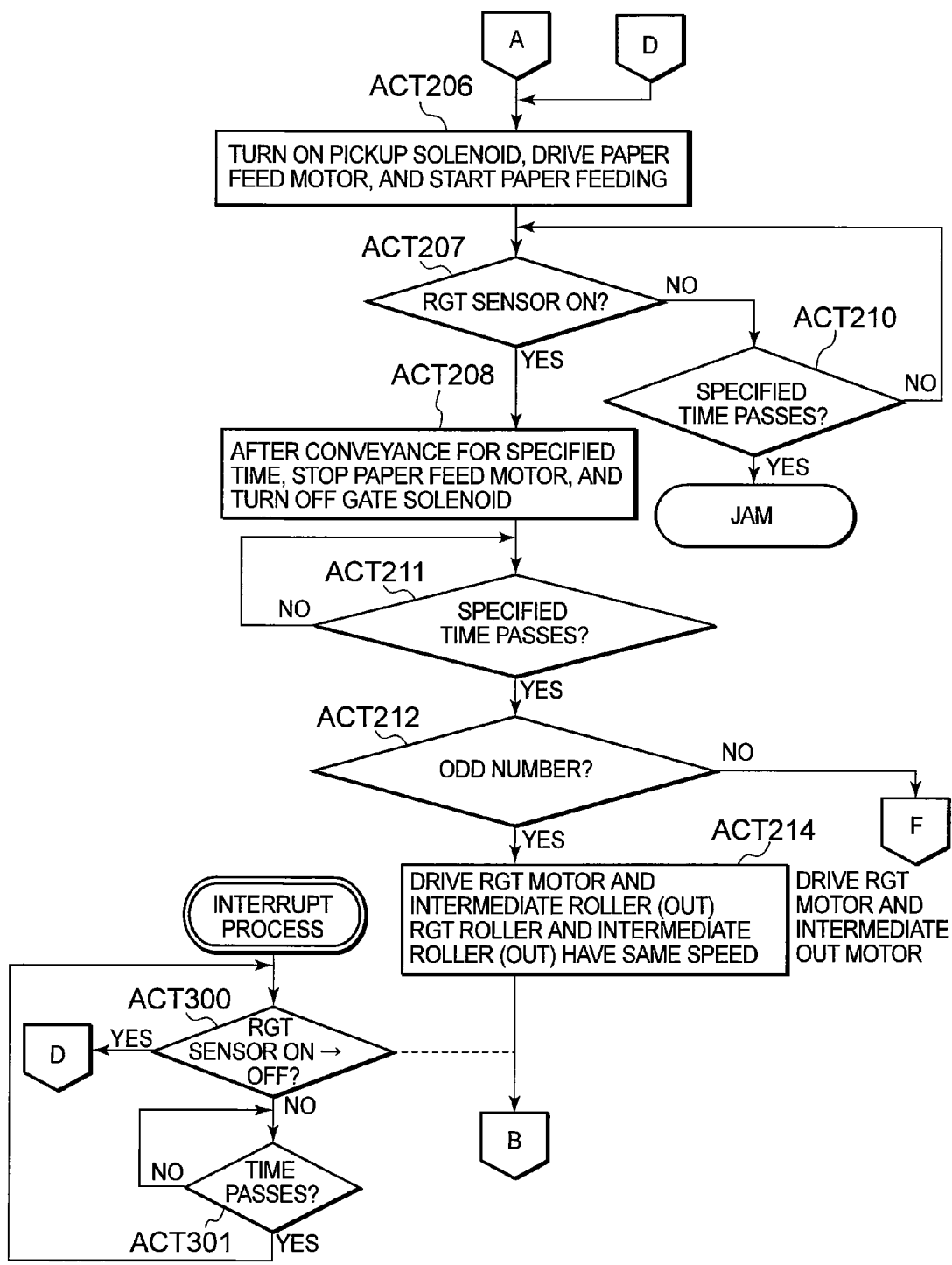
FIG. 5 is a flowchart showing the procedure from document feeding to conveyance to an OUT conveyance member in the embodiment.
Figure 6:
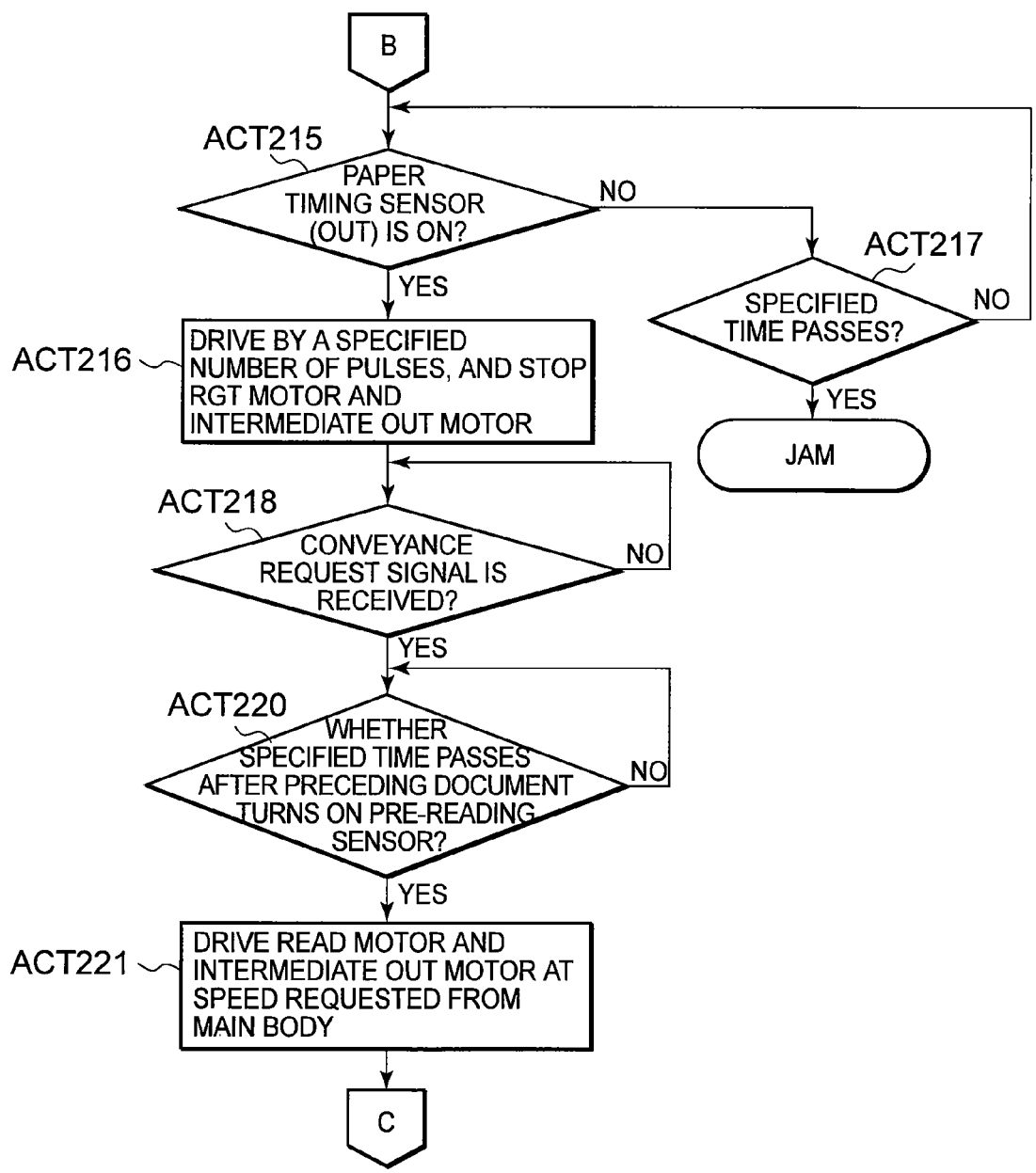
FIG. 6 is a flowchart showing document conveyance using the OUT conveyance member in the embodiment.
Figure 7:
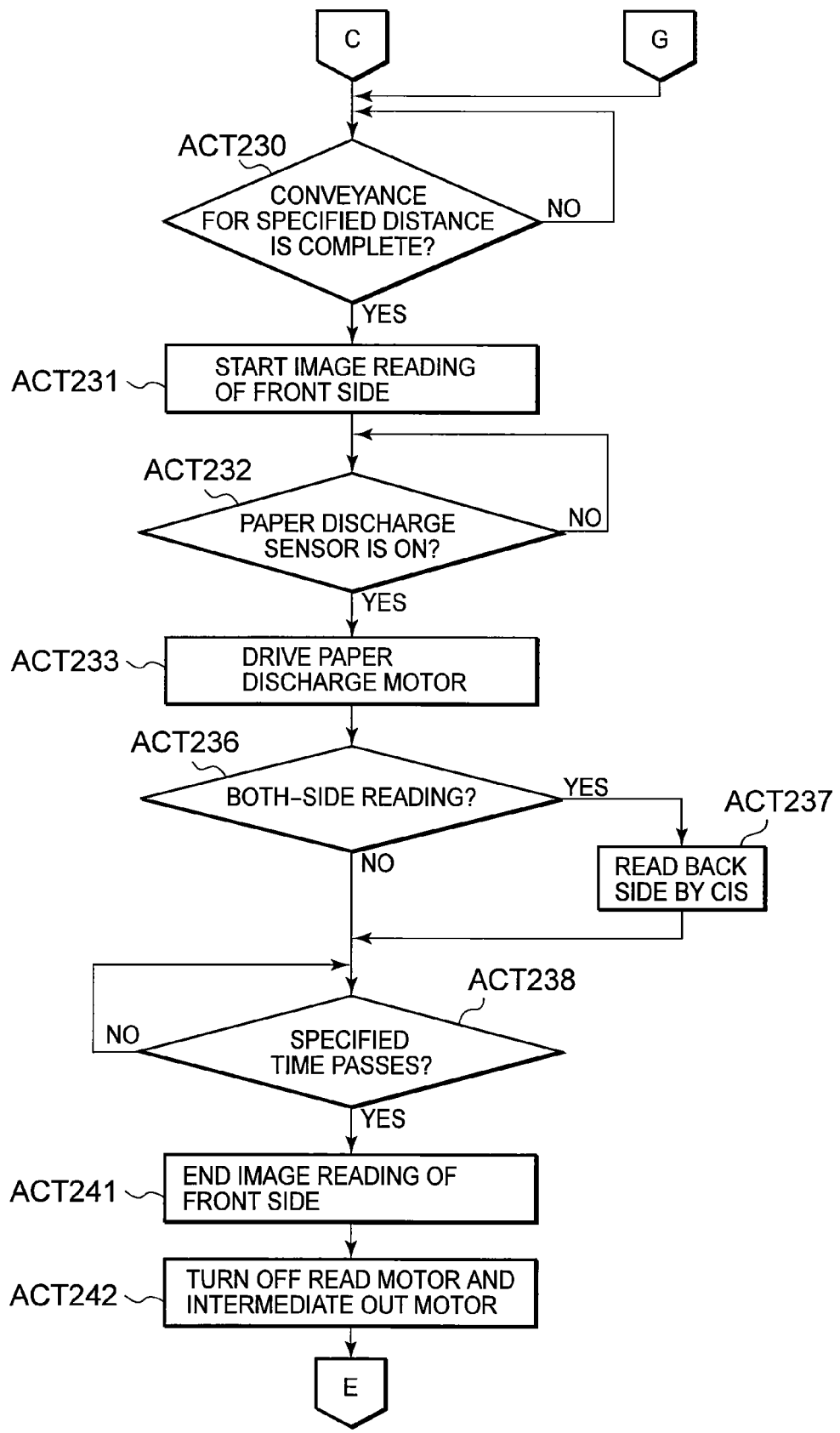
FIG. 7 is a flowchart showing the procedure from image reading start to reading end in the embodiment.
Figure 8:
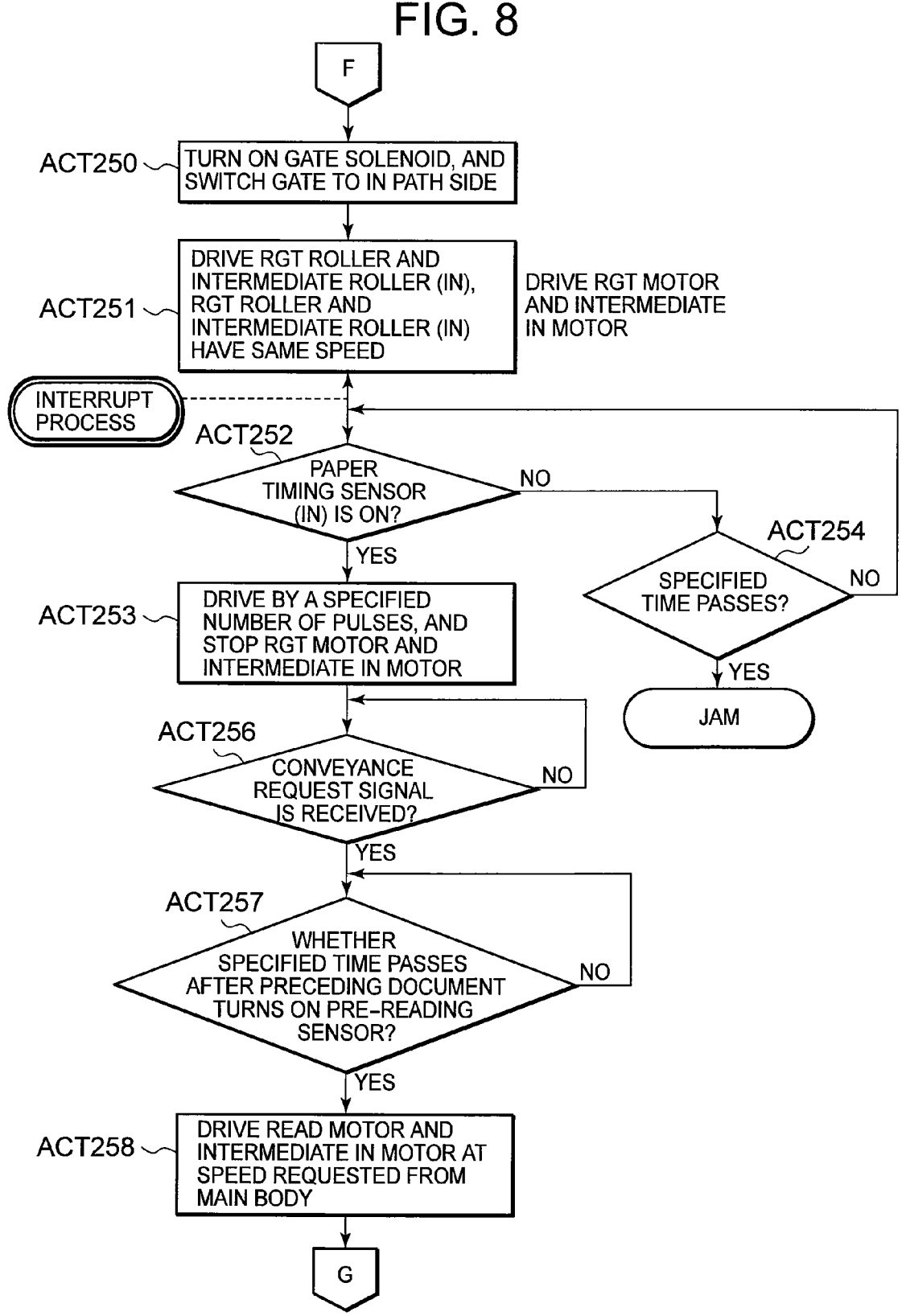
FIG. 8 is a flowchart showing conveyance of a subsequent document using an IN conveyance member in the embodiment.
Figure 9:
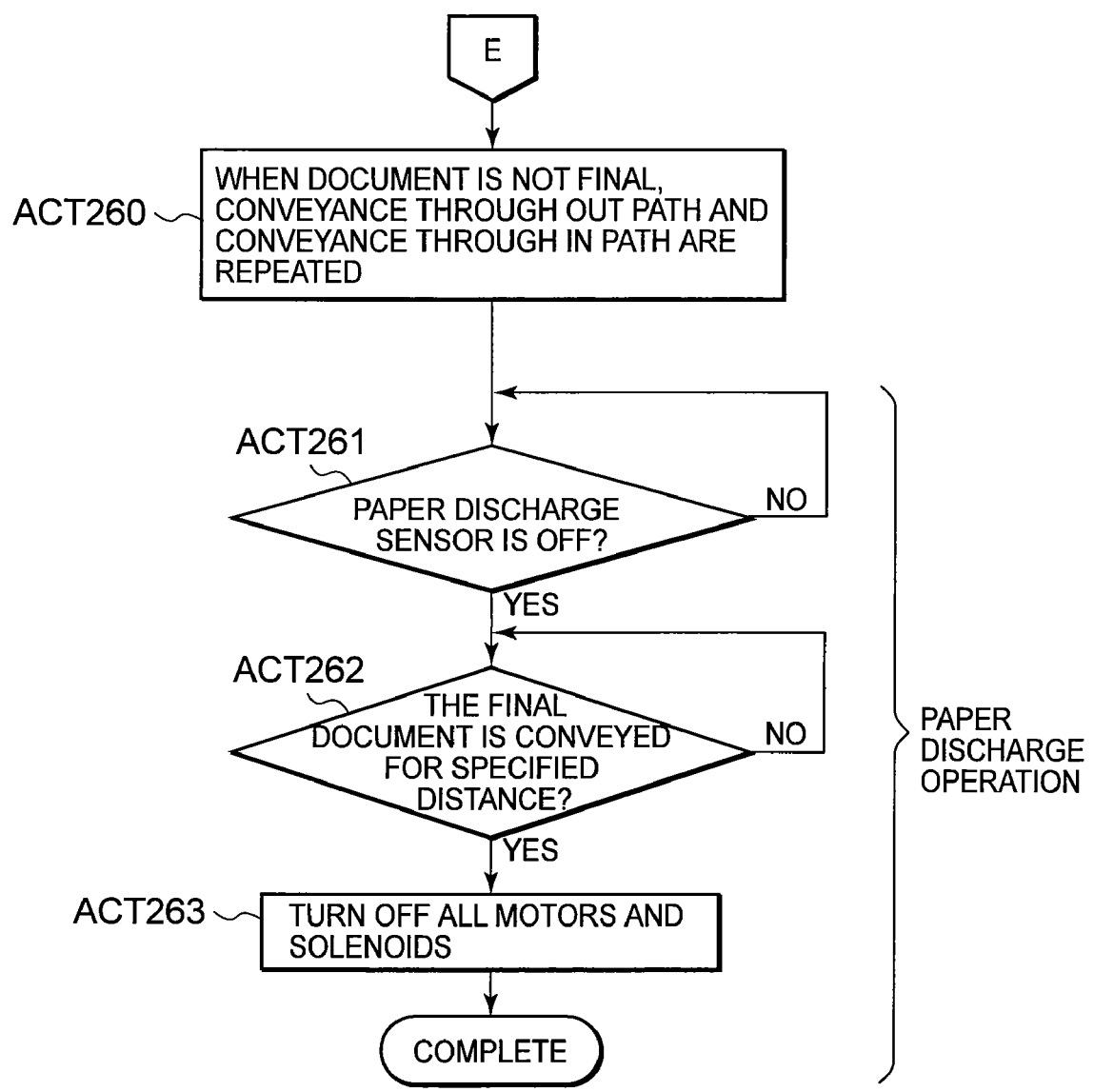
FIG. 9 is a flowchart showing completion of conveyance in the embodiment.

FIG. 3 is a block diagram of a control system 120 in which the ADF 10 is main. A main body control section 121 to control, for example, the whole image forming apparatus including the image scanning device 100 is connected with the CCD 110d and the CIS 60 of the scanner 110. The main body control section 121 controls a CPU 130 of the ADF 10 through an input and output interface 122. The input side of the CPU 130 is connected with the empty sensor 70, the register sensor 71, the paper timing sensor OUT 72, the paper timing sensor IN 73, the pre-reading sensor 76, the reading sensor 77, and the paper discharge sensor 78.

The output side of the CPU 130 is connected with the pickup solenoid 81, the paper feed motor 80, the RGT motor 82, the gate solenoid 83, the intermediate OUT motor 84, the intermediate IN motor 86, the READ motor 87 and the paper discharge motor 88.

The process of continuously conveying the document G of the main size, in which A4 size is used in the vertically long state, will be described by use of flowcharts of FIG. 4 to FIG. 9. After the power is turned on, when the size of the document is the main size or less, the conveyance process is started without change. When the size of the document exceeds the main size, it is inputted from, for example, a control panel of the image forming apparatus that the document has a large size.

(When the Size of the Document is the Main Size)

When the conveyance process is started, at ACT 200, it is confirmed that the ADF 10 is closed, and at ACT 201, all the sensors are detected, and it is confirmed that there is no paper jam in the ADF 10. When the document G is placed on the tray 11 at ACT 202, the empty sensor 70 is turned on, and sends a document on signal to the main body control section 121. At ACT 203, the process waits for receiving a paper feed request signal from the main body control section 121, and advances to ACT 206.

Figure 10:
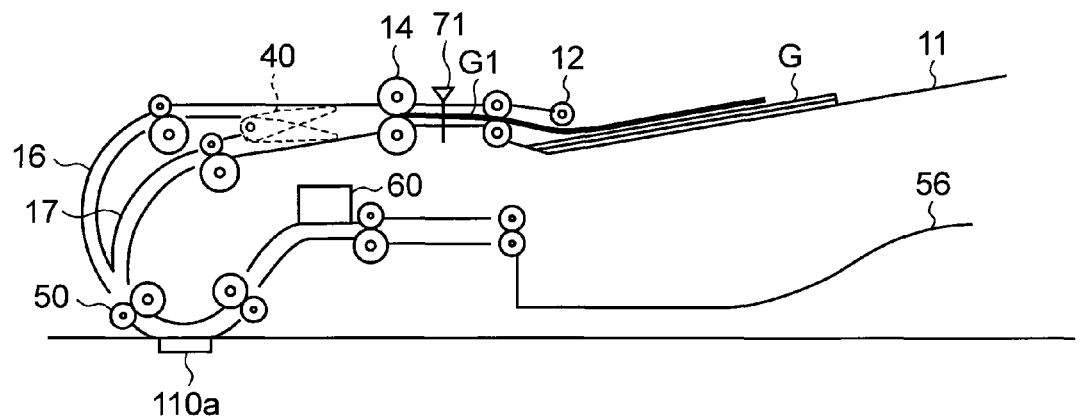
FIG. 10 is an explanatory view showing the start time of feeding of a first document in the embodiment.

At ACT 206, the pickup solenoid 81 is turned on, the paper feed motor 80 is turned on to rotate the pickup roller 12 and the separating and feeding roller 13, and the paper feed operation of a first document G1 as a preceding document is started. At ACT 207, when the register sensor 71 is turned on, after the document G1 is conveyed for a specified time, the paper feed motor 80 is turned off, and the solenoid 83 is turned off (ACT 208). As shown in FIG. 10, the first document G1 collides with the register roller 14, the leading edge position is aligned, and the document is stopped. The gate solenoid 83 sets the gate 40 in the direction in which the first document G1 is distributed to the OUT path 16. When the register sensor 71 is not turned on even if the specified time passes at ACT 210, it is determined that a jam of the document G1 occurs.

Figure 11:
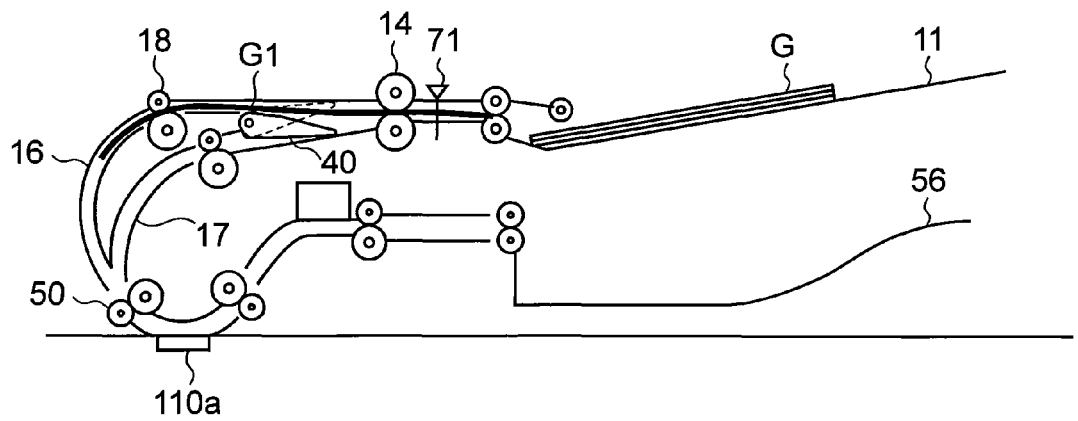
FIG. 11 is an explanatory view showing the time of conveyance of the first document to the OUT conveyance member in the embodiment.

At ACT 211, when the specified time passes and the document G1 is an odd number sheet (ACT 212), the RGT motor 82 and the intermediate OUT motor 84 are turned on, and the register roller 14 and the intermediate OUT roller 18 are rotated (ACT 214). The intermediate OUT roller 18 and the register roller 14 are rotated at a speed equal to the image reading speed. As shown in FIG. 11, the first document G1 is distributed by the gate 40 and advances to the OUT path 16.

Figure 12:
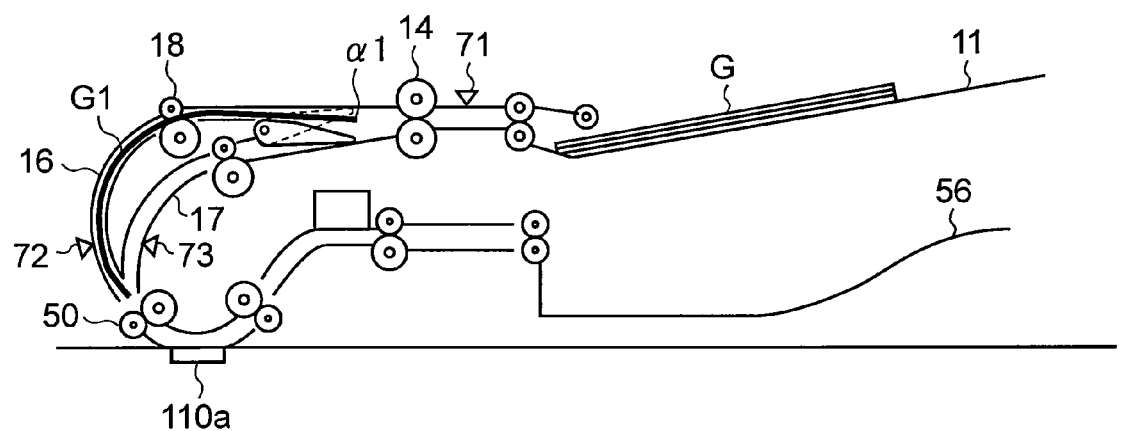
FIG. 12 is an explanatory view showing standby of the first document in an OUT path in the embodiment.

At ACT 215, when the paper timing sensor OUT 72 is turned on, the RGT motor 82 and the intermediate OUT motor 84 are driven by a specified number of pulses and are stopped (ACT 216). As shown in FIG. 12, the first document G1 stops short of the pre-reading roller 50. The trailing edge $\alpha 1$ of the first document G1 passes through the register roller 14. The entire first document G1 is contained in the OUT path 16. When the paper timing sensor OUT 72 is not turned on even if the specified time passes at ACT 217, it is determined that a jam of the document G1 occurs.

At ACT 214, while the first document G1 is conveyed to the OUT path 16, the trailing edge $\alpha 1$ of the first document G1 passes through the register sensor 71. When the trailing edge $\alpha 1$ of the first document G1 passes through the register sensor 71, separately from the conveyance process of the first document G1, a paper feed process of a second document G2 as a subsequent document is started in parallel as an interrupt process. When the trailing edge $\alpha 1$ of the first document G1 passes through the register sensor 71 and the register sensor 71 is changed from on to off (Yes at ACT 300), advance is made to ACT 206, and paper feeding of the second document G2 is started. The interrupt process is performed after the register sensor 71 is changed from on to off (ACT 301).

Figure 13:
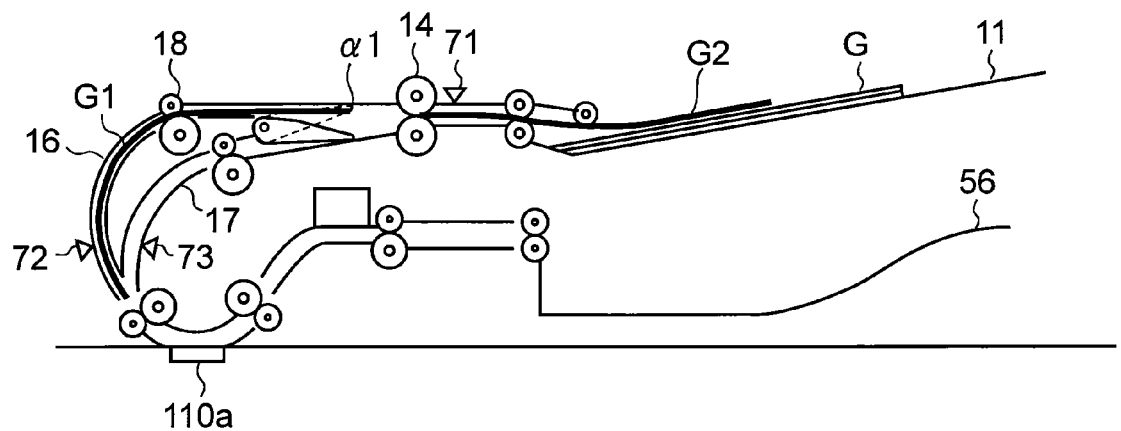
FIG. 13 is an explanatory view showing the start time of feeding of a second document in the embodiment.

At the time of the interrupt process, at ACT 206, the second document G2 is fed to the position of the register roller 14 by the pickup roller 12 and the separating and feeding roller 13. While the second document G2 is being fed, the register roller 14 is stopped at ACT 216. As shown in FIG. 13, the second document G2 collides with the register roller 14, the leading edge position is aligned and the document is stopped.

When the register sensor 71 is turned on by the second document G2 (ACT 207), the process reaches ACT 212 through ACT 208 and ACT 211. At ACT 212, when the document G2 is an even number sheet, advance is made to ACT 250. At ACT 250, the gate solenoid 83 is turned on, and the gate 40 is switched in the direction in which the second document G2 is distributed to the IN path 17. Next, at ACT 251, the RGT motor 82 and the intermediate IN motor 86 are turned on, and the register roller 14 and the intermediate IN roller 28 are rotated. The intermediate IN roller 28 and the register roller 14 are rotated at a speed equal to the image reading speed. The second document G2 is distributed by the gate 40 and advances to the IN path 17.

Figure 14:
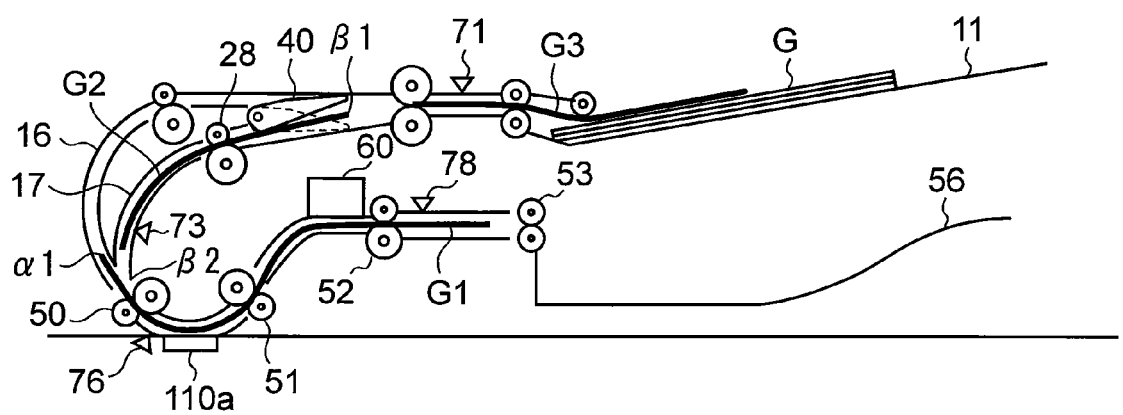
FIG. 14 is an explanatory view showing standby of the second document an IN path and the image reading of the first document in the embodiment.

With respect to the second document G2, when the paper timing sensor IN 73 is turned on at ACT 252, the RGT motor 82 and the intermediate IN motor 86 are driven by a specified number of pulses and are stopped (ACT 253). The second document G2 stops short of the pre-reading roller 50. The trailing edge $\beta 1$ of the second document G2 passes through the register roller 14. The entire second document G2 is contained in the IN path 17. When the paper timing sensor IN 73 is not turned on even if the specified time passes at ACT 254, it is determined that a jam of the second document G2 occurs. As shown in FIG. 14, in the state where the entire document is contained in the IN path 17, the second document G2 stands by for completion of image reading of the front side of the first document G1.

The first document G1 conveyed into the OUT path 16 at ACT 216 waits until a conveyance request signal is received from the main body control section 121 at ACT 218, and advance is made to ACT 220. When the scanner 110 is in a readable state, the main body control section 121 transmits the conveyance request signal to the CPU 130. For example, when there is a document G preceding the first document G1, after the leading edge of the preceding document G turns on the pre-reading sensor 76, when a specified time passes (ACT 220), advance is made to the ACT 221.

At ACT 221, the READ motor 87 and the intermediate OUT motor 84 are turned on to rotate the intermediate OUT roller 18, the pre-reading roller 50, the post-reading roller 51 and the pre-discharge roller 52 at a speed requested from the main body control section 121, and the first document G1 is conveyed to the READ document glass 110a. The timing when the trailing edge of the preceding document G passes through the pre-reading roller 50 is made coincident with the timing when the leading edge of the first document G1 is started to be conveyed by the pre-reading roller 50. The first document G1 is conveyed to the READ document glass 110a in the state where the distance from the trailing edge of the preceding document G is close to 0 mm.

As shown in FIG. 2, the Mylar member 58 presses the preceding document G, which passes through the pre-reading roller 50, to the READ document glass 110a side. The Mylar member 58 corrects curl generated in the preceding document G during conveyance. The lift of the trailing edge $\delta 1$ of the document G is corrected. Accordingly, even when the first document G1 slightly overlaps with the trailing edge $\delta 1$ of the preceding document G, it is prevented that the first document G1 enters under the trailing edge δ1 of the preceding document G. When the first document G1 slightly overlaps with the trailing edge δ1 of the preceding document G, as shown in FIG. 2, the leading edge α2 of the first document G1 overlaps on the trailing edge δ1 of the preceding document G, and is conveyed to the READ document glass 110a. It is prevented that the page order of the preceding document G and the first document G1 is exchanged.

After the first document G1 is started to be conveyed to the READ document glass 110a by the intermediate OUT roller 18, the pre-reading roller 50, the post-reading roller 51 and the pre-discharge roller 52, when the document is conveyed for a specified distance (ACT 230), a read start signal is transmitted to the main body control section 121. By the main body control section 121, the scanner 110 starts the image reading of the front side of the first document G1 (ACT 231).

At ACT 231, the first document G1 continues to travel on the READ document glass 110a, and the image reading by the scanner 110 is continued. As shown in FIG. 14, the first document G1 is conveyed in the direction of the discharge roller 53 through the post-reading roller 51 and the pre-discharge roller 52. During this, until the image reading of the first document G1 is ended, the second document G2 stands by in the state where the entire document is contained in the IN path 17.

When the first document G1 turns on the paper discharge sensor 78 (ACT 232), the paper discharge motor 88 is driven and the paper discharge roller 53 is rotated. In the case of both-side reading (case of Yes at ACT 236), advance is made to ACT 237. At ACT 237, an image of the back side of the first document G1 conveyed in the paper discharge direction is read by the CIS 60. After the paper discharge sensor 78 is turned on, when a specified time passes (ACT 238), the image reading of the front side of the first document G1 by the scanner 110 is ended (ACT 241). After the trailing edge of the document G1 passes through the post-reading roller 51, the READ motor 87 and the intermediate OUT motor 84 are turned off (ACT 242). Thereafter, the first document G1 is conveyed by the paper discharge roller 53.

In parallel, with respect to the subsequent second document G2, at ACT 256, the process waits for receiving a conveyance request signal of the second document G2 from the main body control section 121, and advances to ACT 257.

At ACT 257, after the leading edge of the preceding first document G1 turns on the pre-reading sensor 76, when a specified time passes, advance is made to ACT 258. At ACT 258, the READ motor 87 and the intermediate IN motor 86 are turned on, and the intermediate IN roller 28, the pre-reading roller 50, the post-reading roller 51 and the pre-discharge roller 52 are rotated at a speed requested from the main body control section 121. The timing when the trailing edge α1 of the first document G1 passes through the pre-reading roller 50 is made coincident with the timing when the leading edge β2 of the second document G2 is started to be conveyed by the pre-reading roller 50.

The second document G2 is conveyed to the READ document glass 110a in the state where the distance from the trailing edge α1 of the first document G1 is close to 0 mm. The Mylar member 58 presses the first document G1, which passes through the pre-reading roller 50, to the READ document glass 110a side. The Mylar member 58 corrects the curl which occurs in the first document G1 during the conveyance through the OUT path 16, and prevents the trailing edge α1 from lifting.

Figure 15:
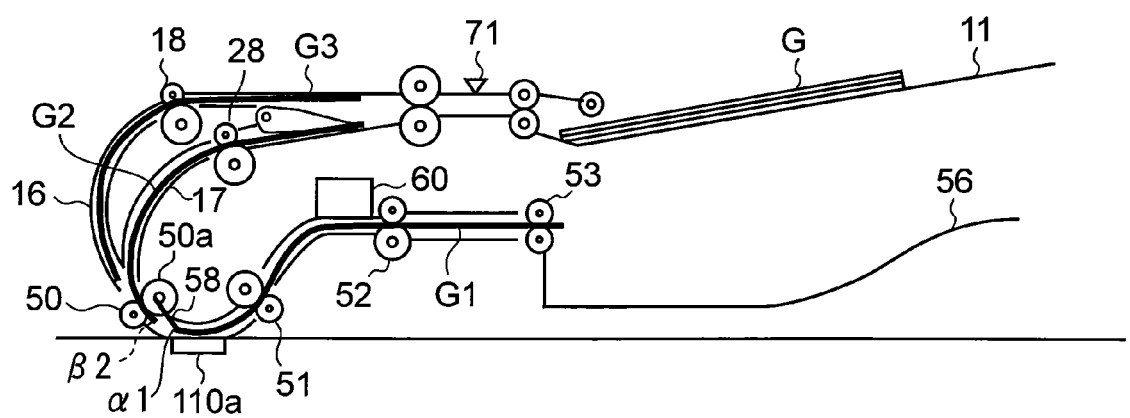
FIG. 15 is an explanatory view showing overlap between the first document and the second document and standby of a third document in the OUT path in the embodiment.

Even when the trailing edge α1 of the first document G1 and the leading edge β2 of the second document G2 slightly overlap with each other, it is prevented that the second document G2 enters under the trailing edge α1 of the first document G1. When the trailing edge α1 of the first document G1 and the leading edge β2 of the second document G2 slightly overlap with each other, as shown in FIG. 15, the leading edge β2 of the second document G2 overlaps on the trailing edge α1 of the first document G1, and is conveyed to the READ document glass 110a. It is prevented that the page order of the first document G1 and the second document G2 is exchanged.

Figure 16:
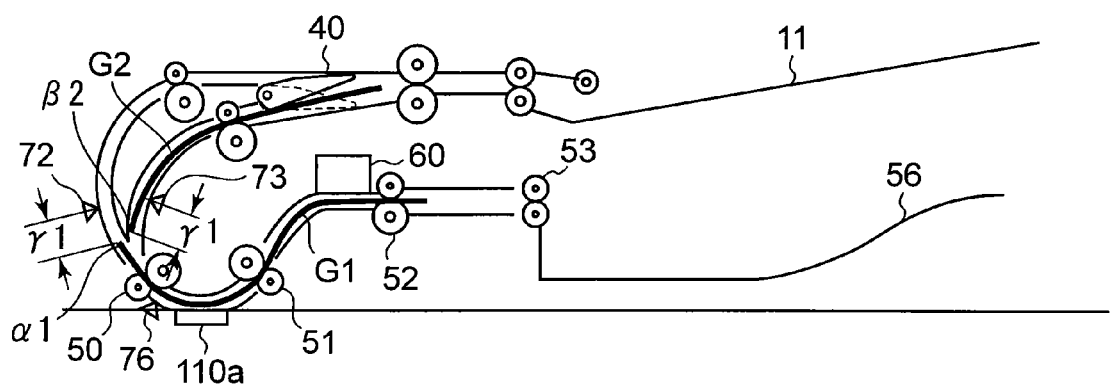
FIG. 16 is an explanatory view showing a distance between the first and the second documents in the embodiment.

In order to achieve the state where the distance between the trailing edge α1 of the first document G1 and the leading edge β2 of the second document G2 is close to 0 mm, for example, the distance between the paper timing sensor OUT 72 and the pre-reading roller 50 is set to be equal to the distance between the paper timing sensor IN 73 and the pre-reading roller 50. As shown in FIG. 16, after the paper timing sensor IN 73 is turned on, the second document G2 advances by a specified distance γ1 and stands by at the position. When the trailing edge α1 of the first document G1 passes through the paper timing sensor OUT 72 and advances by the specified distance γ1, the intermediate IN motor 86 is turned on, and the second document G2 is conveyed in the direction of the READ document glass 110a. By this, the distance between the trailing edge α1 of the first document G1 and the leading edge β2 of the second document G2 can be made close to 0 mm.

Alternatively, the conveyance timings of the first document G1 and the second document G2 are previously adjusted from the detection result of the paper timing sensor OUT 72 and the detection result of the paper timing sensor IN 73, and the distance between the first document G1 and the second document G2 may be made close to 0 mm.

In parallel, at ACT 251, when the trailing edge β1 of the second document G2 passes through the register sensor 71, an interrupt process of ACT 300 and ACT 301 in which a third document G3 as a next document is fed is started. The interrupt process is performed after the trailing edge β1 of the second document G2 passes through the register sensor 71 and the register sensor 71 is changed from on to off. At the time of the interrupt process, the third document G3 is fed to the position of the register roller 14. As shown in FIG. 14, the third document G3 collides with the register roller 14, the trailing edge position is aligned and the document is stopped.

When the register sensor 71 is turned on by the third document G3 (ACT 207), the process reaches ACT 212 through ACT 208 and ACT 211. At ACT 212, when the document G3 is an odd number sheet, advance is made to ACT 214 while the gate solenoid 83 remains off. Similarly to the first document G1, with respect to the third document G3, ACT 214 to ACT 216 are performed. As shown in FIG. 15, the entire third document G3 is contained in the OUT path 16.

Figure 17:
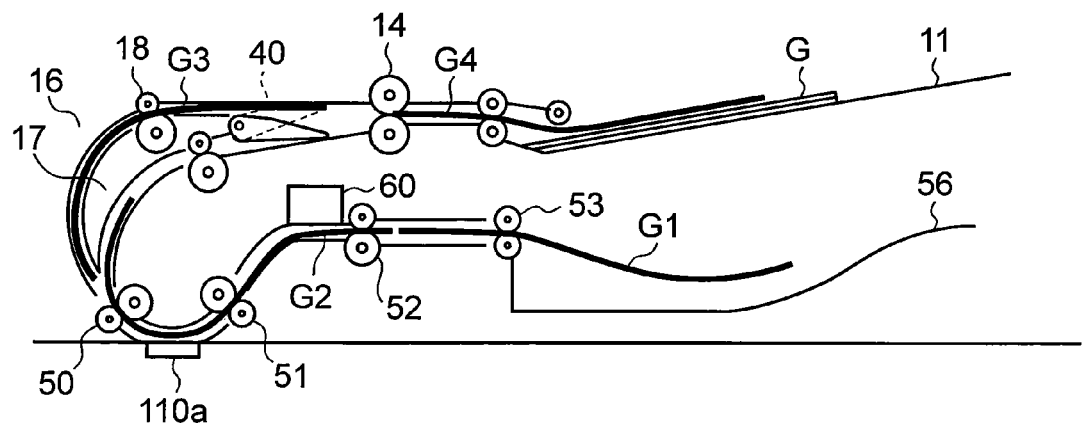
FIG. 17 is an explanatory view showing the start time of feeding of a fourth document in the embodiment.

After the second document G2 is started to be conveyed to the READ document glass 110a by the intermediate IN roller 28, the pre-reading roller 50, the post-reading roller 51 and the pre-discharge roller 52, when the document is conveyed for a specified distance (ACT 230), the scanner 110 starts the image reading of the front side of the second document G2 (ACT 231). As shown in FIG. 17, the first document G1 is discharged in the direction of the storage tray 56 by the paper discharge roller 53, and the second document G2 travels on the READ document glass 110a. The CIS 60 reads an image of the back side of the second document G2. The third document G3 stands by in the OUT path 16. A fourth document G4 collides with the register roller 14 by an interrupt process, the leading edge position is aligned, and the document is stopped and then enters the IN path 16.

When the document G is not a final document, ACT 214 to ACT 221 (conveyance of the document G through the OUT path 16) and ACT 250 to ACT 258 (conveyance of the document G through the IN path 17) are alternately repeated. The conveyance is performed continuously in the state where the distance between the preceding document and the subsequent document is close to 0 mm, or in the state where the leading edge of the subsequent document overlaps on the trailing edge of the preceding document (ACT 260). When the document G is the final document and the paper discharge sensor 78 is turned off (ACT 261), the final document is conveyed for a specified distance by the paper discharge roller 53 (ACT 262), all the motors and solenoids are turned off (ACT 263), and the document conveyance of the ADF 10 is completed.

(When the Size of a Document is Smaller than the Main Size)

The conveyance process of a document smaller than the main size is similar to that of the case of the main size.

(When the Size of a Document Exceeds the Main Size)

Figure 18:
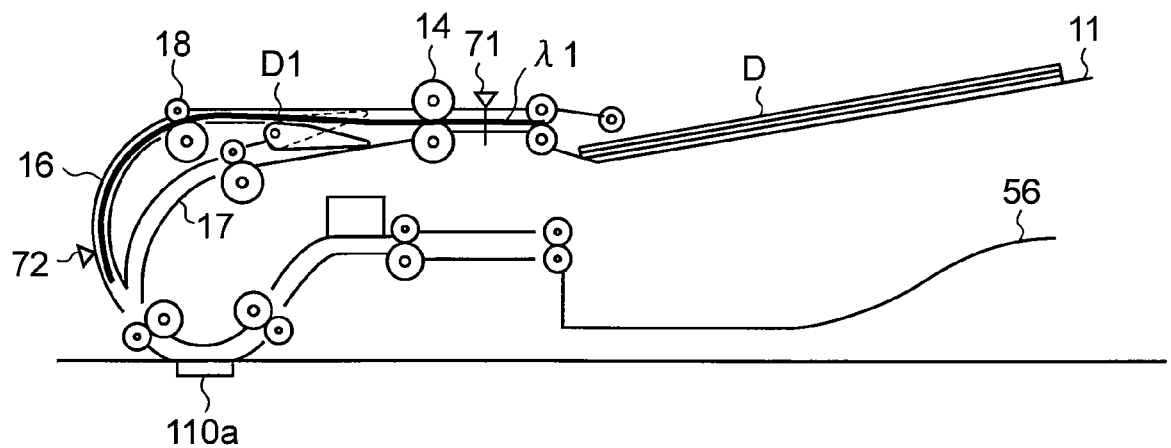
FIG. 18 is an explanatory view showing standby of a document exceeding a main size in the embodiment.

The conveyance process of a document exceeding the main size is different from that of the document of the main size in the timing when a subsequent document is taken out from the tray 11. At the time of conveyance of a document D exceeding the main size, after the document D is taken out from the tray 11, at ACT 216, a first document D1 stops short of the pre-reading roller 50. As shown in FIG. 18, the entire first document D1 can not be contained in the OUT path 16. The first document D1 stands by for conveyance in the direction of the READ document glass 110a in the state where the trailing edge λ1 protrudes from the register roller 14.

In the case of the document of the main size, the interrupt process of ACT 300 and ACT 301 is performed immediately after the execution of ACT 216. In the case of the document exceeding the main size, until the first document D1 is started to be conveyed in the direction of the READ document glass 110a by execution of ACT 221, the register sensor 71 is kept on by the trailing edge λ1. In the case of the document exceeding the main size, the interrupt process of ACT 300 and ACT 301 is performed after the execution of ACT 221. The other conveyance process is similar to that of the document of the main size.

According to the embodiment, the lengths of the OUT path 16 and the IN path 17 are made longer than the length of A4 size in the vertical direction as the length of the document of the main size in the traveling direction. The document of the main size stands by for conveyance in the direction of the READ document glass 110a in the state where the entire document is contained in the OUT path 16 or the IN path 17.

When the document of the main size is continuously conveyed, after the preceding document is sent to the OUT path 16 or the IN path 17, the subsequent document is immediately supplied to the position where the document collides with the register roller 14. When he document is taken out from the tray 11, there is a case where sliding occurs between the pickup roller 12 or the separating and feeding roller 13 and the document, and the taking-out speed becomes slightly low. Even in such a case, when the document enters the OUT path 16 or IN path 17, the subsequent document is certainly taken out to the position of the register roller 14. It can be certainly prevented that the entrance of the document into the OUT path 16 or the IN path 17 is delayed. The reliability of high-speed conveyance of the document by the ADF 10 is raised, and the image reading speed by the scanner 110, and the productivity of the image forming apparatus using the scanner 110 can be improved.

According to the embodiment, the entrance speed of the document into the OUT path 16 or the IN path 17 is not increased, but is equal to the read speed at the time of reading by the scanner 110. The damage of a document caused when the entrance speed of the document into the OUT path 16 or the IN path 17 is increased can be prevented, or the noise can be suppressed to be low.

According to the embodiment, the distance between the preceding document conveyed to the READ document glass 110a and the subsequent document is made close to 0 mm. When the preceding document and the subsequent document overlap with each other, the leading edge of the subsequent document overlaps on the trailing edge of the preceding document G1 and is conveyed. It is certainly prevented that the page order is exchanged during the conveyance of continuous documents.

The invention is not limited to the above embodiment, but can be variously modified within the scope of the invention. For example, as long as the length from the register roller to the first image reading member is longer than the whole length of the document in the traveling direction, the shapes and structures of the plurality of conveyance members are not limited. Further, the size of the document is also not limited. Besides, the distance between the preceding document and the subsequent document is not also limited, and the width of the overlap when the preceding document and the subsequent document overlap with each other is also arbitrary. Besides, the structure of the image reading member to read the document is not also limited. In the embodiment, for further miniaturizing the apparatus, a smaller CIS may be used instead of the scanner to read the front side of the document.

What is claimed is:

1. An auto document feeding device comprising:
   a register member to align a leading edge of a document from a document placing member;
   a supply member to supply the document from the document placing member to the register member;
   a plurality of conveyance members comprising a first conveyance member or a second conveyance member to cause a leading edge of a subsequent document to overlap with a trailing edge of a preceding document, and to convey the preceding document and the subsequent document to a first image reading member and comprising different paths whose lengths are longer than the whole length of the document in a traveling direction, and which guide the document sent from the document placing member to the first image reading member;
   a gate member to distribute sequentially the document which was sent from the document placing member and passing through the register member to one of the first conveyance member and the second conveyance member; and
   a paper discharge member to discharge the document passing through the first image reading member.

2. The device of claim 1, further comprising, on the paper discharge member, a second image reading member to read an image of the document, wherein the first image reading member reads the image of a first side of the document, and the second image reading member reads the image of a second side of the document.

3. The device of claim 1, wherein the document is a document of a main size.

4. The device of claim 1, wherein while an image of a preceding document is being read by the first image reading member, the first conveyance member or the second conveyance member makes a subsequent document stand by when a trailing edge thereof has passed through the register member.

5. The device of claim 1, wherein the first conveyance member or the second conveyance member conveys a trailing edge of a preceding document to pass through the first image reading member at a time when a leading edge of a subsequent document reaches the first image reading member, and conveys the preceding document and the subsequent document to the first image reading member.

6. An image scanning device comprising:
 a register member to align a leading edge of a document from a document placing member;
 a supply member to supply the document from the document placing member to the register member;
 a first image reading member to read an image of the document;
 a plurality of conveyance members comprising a first conveyance member or a second conveyance member to cause a leading edge of a subsequent document to overlap with a trailing edge of a preceding document, and to convey the preceding document and the subsequent document to the first image reading member and comprising different paths whose lengths are longer than the whole length of the document in a traveling direction, and which guide the document sent from the document placing member to the first image reading member;
 a gate member to distribute sequentially the document which was sent from the document placing member and passing through the register member to one of the first conveyance member and the second conveyance member; and
 a paper discharge member to discharge the document passing through the first image reading member.

7. The device of claim 6, further comprising, on the paper discharge member, a second image reading member to read an image of the document, wherein the first image reading member reads the image of a first side of the document, and the second image reading member reads the image of a second side of the document.

8. The device of claim 6, wherein the document is a document of a main size.

9. The device of claim 6, wherein while an image of a preceding document is being read by the first image reading member, the first conveyance member or the second conveyance member makes a subsequent document stand by when a trailing edge thereof has passed through the register member.

10. The device of claim 9, wherein while the subsequent document stands by in the first conveyance member or the second conveyance member, the supply member supplies a next document from the document placing member to the register member.

11. The device of claim 6, wherein the first conveyance member or the second conveyance member conveys a trailing edge of a preceding document to pass through the first image reading member at a time when a leading edge of a subsequent document reaches the first image reading member, and conveys the preceding document and the subsequent document to the first image reading member.

12. A method of conveying a document, comprising:
 distributing documents passing through a register member to a plurality of conveyance members;
 conveying the documents distributed to the plurality of conveyance members to a first image reading member, sequentially and continuously;
 making a subsequent document stand by in one of the conveyance members when a trailing edge thereof has passed through the register member while a preceding document is conveyed to the first image reading member and a leading edge of the subsequent document overlaps with the trailing edge of the preceding document; and
 discharging the preceding document passing through the first image reading member and then the subsequent document.

13. The method of claim 12, wherein the first image reading member reads an image of a first side of the document, and a second image reading member reads an image of a second side of the document while the document is discharged.

14. The device of claim 4, wherein while the subsequent document stands by in the first conveyance member or the second conveyance member, the supply member supplies a next document from the document placing member to the register member.

15. The method of claim 12, wherein while the subsequent document is made to stand by in one of the conveyance members, supplying a next document to the register member.

* * * * *